United States Patent [19]
Callahan, Jr. et al.

[11] 3,981,482
[45] Sept. 21, 1976

[54] FLUID SYSTEM DEVICE

[75] Inventors: Francis J. Callahan, Jr., Chagrin Falls; Bernard J. Gallagher, South Euclid, both of Ohio; Stephen Matousek; Ulrich H. Koch, both of Moraga, Calif.

[73] Assignee: Whitey Research Tool Co., Emeryville, Calif.

[22] Filed: Dec. 20, 1974

[21] Appl. No.: 534,607

Related U.S. Application Data

[62] Division of Ser. No. 406,272, Oct. 15, 1973.

[52] U.S. Cl. .............................. 251/152; 251/148; 251/315; 137/454.2
[51] Int. Cl.² ........................................ F16K 51/00
[58] Field of Search ........... 251/148, 150, 151, 152, 251/315; 137/454.2

[56] References Cited
UNITED STATES PATENTS

| | | | |
|---|---|---|---|
| 3,072,139 | 1/1963 | Mosites | 137/454.2 |
| 3,401,914 | 9/1968 | Shand | 251/315 |
| 3,450,151 | 6/1969 | Heutzenroeder | 251/315 |
| 3,508,736 | 4/1970 | Rhodes et al. | 251/315 |
| 3,671,010 | 6/1972 | Scaramucci | 251/315 |
| 3,672,632 | 6/1972 | Chow | 137/454.2 |
| 3,674,052 | 7/1972 | Hartman et al. | 251/315 |
| 3,722,856 | 3/1973 | Koch et al. | 251/152 |

*Primary Examiner*—William R. Cline
*Assistant Examiner*—H. Jay Spiegel
*Attorney, Agent, or Firm*—Fay & Sharpe

[57] ABSTRACT

The specification and drawings disclose a ball valve designed to be highly reliable and easily maintained. The disclosed valve comprises an intermediate body section positioned between a pair of end fittings which are connected to the body by a plurality of longitudinally extending tie bolts. The tie bolts are arranged so that with removal of one, preferably color-coded or otherwise identified, the body can be pivoted outwardly from between the end fittings. The valve further includes seal assemblies axially removable from the ends of the intermediate body section and arranged to provide a seal between the end fittings and the body as well as between the body and an internally mounted valve ball. An improved stem seal and operating handle assembly for the valve are also provided in the valve.

19 Claims, 11 Drawing Figures

FLUID SYSTEM DEVICE

This is a division of application Ser. No. 406,272, filed Oct. 15, 1973.

BACKGROUND OF THE INVENTION AND BRIEF DESCRIPTION THEREOF

The subject invention is directed toward the art of fluid system devices and, more particularly, to an improved device and method of making the same.

The invention is especially suited for use in ball valves and will be described with particular reference thereto; however, as will become apparent, it could be used in many types of fluid system devices.

Many ball valves currently available comprise a main body section which houses the ball and seal rings. Attached to the opposite ends of the main body are end fittings which provide means by which the valve can be connected to associated piping or tubing. Typically, the end fittings and the body are interconnected by a plurality of tie bolts passing longitudinally through aligned openings in both the body and the end fittings. Appropriate seals are disposed between the end fittings and the body.

In order to replace the seals, however, it is necessary to remove the tie bolts and slide the body from between the fittings. This procedure is time consuming and, at times, presents difficulty in getting the body properly realigned with the fittings. Additionally, and with many designs, the associated piping must be moved before access to the seals is possible.

The subject invention overcomes the above problem and provides a flow system device which comprises a main central body section having a longitudinally extending through-flow passage and a valve ball mounted for rotation therein. A pair of end members, including flow openings, are positioned on longitudinally opposite ends of the body section with at least three tie bolts extending between the end members substantially parallel to the through-flow passage. Each tie bolt member passes through each end member with only one of the tie bolt members passing through the body section. The tie bolts are spaced circumferentially about the through-flow passage such that by removing one of the tie bolts adjacent to the bolt which extends through the body section, the body section can be pivoted outwardly from between the end members.

Although the arrangement is particularly suited for use in ball valves, the invention also contemplates that generally the same body, end fitting, and tie bolt relationships can be employed in many different devices used in fluid systems. For example, filters, flow gauges, sight gauges, check valves, and the like can advantageously be designed to use the inventive body or housing arrangement.

As can be appreciated, when the above arrangement is used in ball valves, seals can be changed by removing only a single tie bolt. Moreover, throughout the changing, the body section is held in position such that proper realignment is achieved merely by rotating the body back into its original position.

According to a more limited aspect of the invention, the body section is designed such that a portion of its exterior surface engages at least one of the bolts when it is in an aligned position between the end members. Preferably, at least one of the bolts which does not pass through the body section is positioned to engage portions of the exterior surface. Additionally, the body section is preferably of uniform cross-section throughout its length. Thus, the body section can be comprised of an extrusion in order to reduce machining time and manufacturing cost in a manner to be further discussed hereinafter. It is also contemplated that exterior portions of the body section will extend radially outward of the bolts an amount sufficient to permit the body section to be gripped by a wrench without engaging the bolts. This reduces the possibility of damaging the bolts while making connections to the end fittings.

In line with the previously discussed swing-out arrangement, the subject invention provides combined ball seat and body seal assemblies which can be removed and replaced as a unit to facilitate changing. In particular, the seal assemblies are adapted to be positioned in opposite ends of the through-flow passage of the body section and comprise a seat ring formed from a resilient material having a first surface arranged to engage the ball and a second surface, preferably planar, facing outwardly of the bore. A sleeve member closely encircles the seat ring and is adapted to be slidably received in a recess formed about the end of the bore. Encircling the sleeve member is a resilient seal ring, preferably an O-ring, which is adapted to provide a seal between the central body section and the end fittings. The end fittings also include surfaces which engage the second face of the seat ring and the seal ring when the body section is moved to its located position therebetween.

The provision of the sleeve between the seat ring and the seal ring prevents extrusion or cold flow of the seat ring outwardly between the body and the end fittings. Additionally, the sleeve provides a confined recess in which the O-ring is received. Because the O-ring member resiliently engages the outer surface of the sleeve, the entire assembly can be handled and inserted as a unit. Further, and in accordance with a more limited aspect of this feature of the invention, the inner surface of the sleeve includes a shoulder which confines the radial outward portion of the seat ring so as to, in effect, clamp it in order to hold the seat ring properly located with respect to the ball at all times. To simplify maintenance problems and to prevent improper reassembly, the seal assemblies on each side are preferably identical and/or interchangeable. However, for certain applications they could be different.

A further feature of the invention resides in the provision of an improved handle stop arrangement. As is well known, most ball valves are designed so that a 90° movement of the operating handle moves the valve between the full open and full closed positions. Normally, it is desirable to provide stops at both extreme positions of handle movement; and for this purpose, stop pins are often positioned in the top of the valve body to extend upwardly for engagement of the lateral sides of the handle member at predetermined positions of movement. Alternatively, it has been known to form cast or somewhat complex machined handles with depending stop arrangements which engage machined stop surfaces or pins on the body. As one of its features, the subject invention provides a novel handle stop arrangement in which the handle member can be a simple stamping having a pair of tabs bent downwardly to provide stops which engage longitudinally extending surfaces formed on the body. According to this aspect of the invention, the improvement generally comprises first and second stop surfaces formed on the exterior of the valve and positioned on laterally opposite sides of the operating stem. The handle is connected to the stem for rotation thereof between the first and second spaced points which are normally 90° apart. The handle includes first and second depending stop members bent downwardly from the plane of the handle with the first stop member being positioned to engage the first stop surface at the first position of rotation and the second stop member being positioned to engage the second stop surface at the second position of rotation. The stop members are located such that when they engage their respective stop surfaces, the contact forces act parallel to the plane in which the line of bend of the respective stop member lies.

By orienting the stop members relative to the stop surfaces in the manner described hereinabove, all forces acting against the bent stops act in the direction of greatest strength of the stops; that is, the forces do not act to produce an unbending of the bent metal stops. This permits the handle to be a simple metal stamping with the stops bent downwardly.

The invention also contemplates that the depending stops can only engage the valve body in the intended direction. The stops are located such that when one stop is in engagement with the valve body, the other stop is spaced a distance outwardly of the body. The handle stop is symmetrical to the centerline of the body, allowing the handle to be reversed 180° and used as an indication of flow direction.

Because of the arrangement of the handle stops and the use of a simple stamping for the handle, the manufacturing effort is greatly simplified. This permits handles to be readily varied to suit specific different needs. For example, the handles can be varied in length, supplied for reversed position, mechanically actuated, locked, etc., with a minimum of complexity.

An additional feature of the invention resides in the provision of a stem packing arrangement particularly suited for the valve hereinabove described. In general, the stem packing arrangement includes a bore extending radially through the body which is provided with a flange or shoulder extending radially inward relative to the bore. The stem is sized so as to be freely rotatable within the bore flange and includes a stem flange adapted to extend outwardly beneath the bore flange. A thrust bearing member is positioned between the bore flange and the stem flange and a seal assembly is located above the bore flange. Additionally, a compression gland is positioned about the stem to engage the upper surface of the seal assembly. A gland nut is threadedly received on the outer end of the stem to compress the seal assembly and form a seal about the stem when tightened. Preferably, the thrust bearing member is split so that it does not inadvertently form a seal. Because of the arrangement of the flanges, the stem is blowout proof even when the packing is removed.

OBJECTS OF THE INVENTION

A primary object of the invention is the provision of a device for fluid systems in which the main body is arranged for swing-out movement upon removal of a single longitudinally extending tie bolt.

A further object is the provision of a device of the type referred to in which the main body has wrench contact surfaces arranged to prevent damage to the tie bolts during installation.

Another object is the provision of a valve of the general type described which has easily removable seal assemblies for both the ball seals and the stem seals.

A still further object is the provision of a ball valve of the general type described which is extremely simple to manufacture and uses metal extrusions for the main body and the end fittings.

A still further object of the invention is the provision of a ball valve handle stop arrangement which facilitates the use of a simple metal stamping for the handle with the stop members comprising downwardly bent portions thereof.

Another object is the provision of an improved method for forming fluid system devices of the general type under consideration.

BRIEF DESCRIPTION OF THE DRAWINGS

The above and other objects and advantages will become apparent from the following description when read in conjunction with the accompanying drawings wherein.

DETALIED DESCRIPTION OF THE DRAWINGS

Referring more particularly to FIGS. 1–4, the valve 10 is illustrated as including a main central body section 12 which is positioned between a pair of end members 14 and 16. As shown, the end members 14 and 16 are connected to the body by longitudinally extending tie bolts 18.

Figure 3:
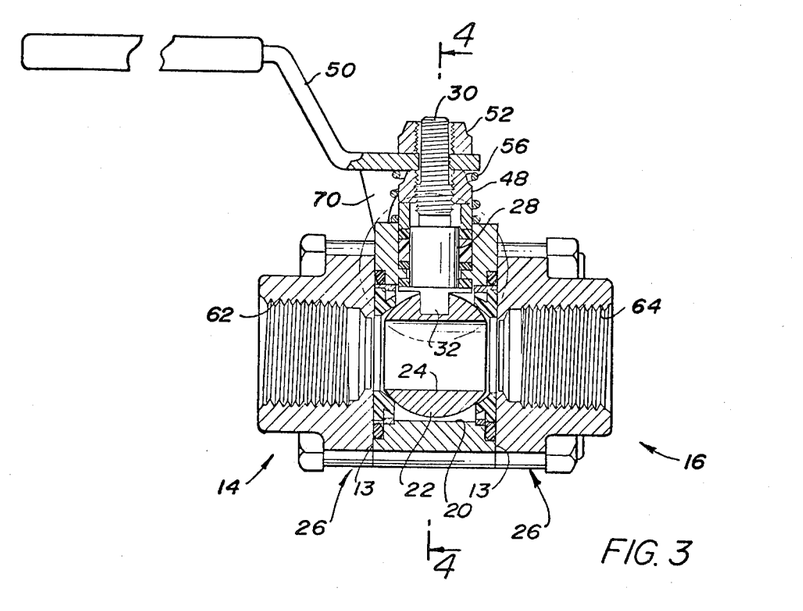
FIG. 3 is a vertical cross-section through the valve of FIG. 1.
Figure 4:
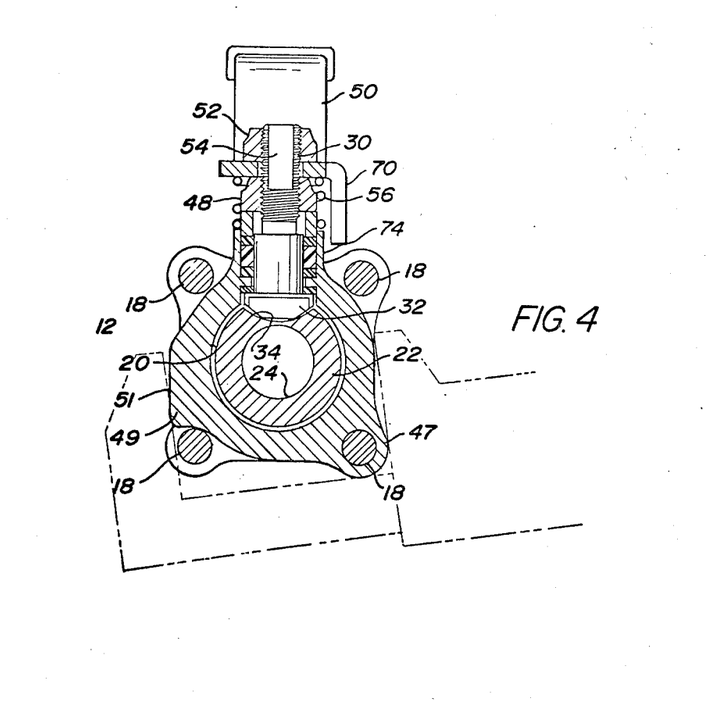
FIG. 4 is a cross-sectional view taken on line 4—4 of FIG. 3, and including in phantom a wrench for tightening the valve to the respective pipe end without damaging the tie bolt.

In its preferred form, the central body section 12 is formed from a single section of extruded stock. As best seen in FIG. 4, section 12 has a uniform cross-sectional configuration with a circular flow passage 20 extending longitudinally therethrough. Passage 20 defines the valve chamber and houses a conventional ball member 22 having a through-flow opening 24. Positioned in opposite ends of the body section 12 are seal ring assemblies 26 (FIG. 3). Details of the seal ring assemblies 26 will subsequently be described in detail; however, for the present it is sufficient to note that the assemblies 26 include means for sealing between the ball and the end members as well as between the central body section and the end members.

As mentioned earlier, the central body section 12 is of a uniform cross-sectional configuration throughout its length as best shown in FIG. 4. Preferably, it is formed from bar stock extruded in the desired configuration and cut to the required length. The end faces 13 of the body section are preferably parallel to each other and perpendicular to the axis of passage 20.

Extending generally radially into the body section 12 is an opening 28, which is located midway between and parallel to the end faces 13. An operating stem member 30 passes through opening 28 into engagement with the ball 22. It will be noted that the lower end of stem 30 includes a narrow rib or web 32 which has a somewhat truncated end face received in an arcuate slot 34 formed in the top surface of ball 22 in a direction generally perpendicular to the ball flow-through opening 24. This arrangement permits the ball to have some axially freedom when in the closed position.

Figure 3A:
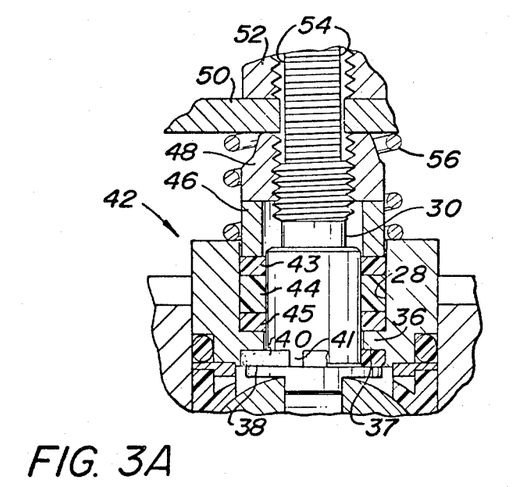
FIG. 3A is an enlarged view of the circled section of FIG. 3.

As best shown in FIG. 3A, bore 38 has a radially inwardly extending flange 36 which forms a downwardly facing shoulder 37. A similar, radially outward extending flange 38 is formed about the lower end of stem 30. Positioned between flanges 36 and 38 is a thrust bearing member 40 preferably formed from a relatively rigid polymeric material such as, for example, molybdenum disulfide or ceramic-filled polytetrafluoroethylene (TFE). It is preferable that the thrust bearing member 40 not form a seal; and for this reason, the ring 40 is preferably split as shown at 41 in FIG. 3A. By splitting the bearing member 40, the pressures exerted on opposite sides of flange 38 are balanced. In this manner, the effective pressure acting outwardly on the stem is determined by the stem diameter. Typically, this can result in a 50 percent reduction in pressure on the thrust member 40. Also, the split reduces the possibility of virtual leak problems when the valve is used in vacuum systems.

Located above the flange 36 is a packing or stem seal assembly 42. Seal assembly 42 comprises three ring members 43, 44 and 45. Ring member 44 is the primary seal element and is, for example, formed from unfilled TFE. Members 43 and 45 are arranged to be closely received within the annular space between the stem and the bore and serve as confining members to prevent cold flow of ring 44. Rings 43 and 45 are preferably formed from a filled polytetrafluoroethylene having a substantial hardness when compared to the unfilled TFE 44. The packing assembly 42 is placed under a predetermined compression by a packing gland member 46 which is sized so as to be freely receivable in the open upper end of bore 28. A nut member 48 is received on the threaded outer end of stem 30 and, upon tightening, compresses the thrust member 40 and the packing assembly 42.

An operating handle 50 is connected to the outer end of stem 30 by a nut member 52. It should be noted that the laterally opposite sides of the stem 30 are provided with flats 54 to receive handle 50 and prevent it from turning apart from stem 30. Similarly, the opening in the handle member 50 through which the stem passes is of noncircular shape generally corresponding to the shape of the stem so as to assure stem movement upon handle rotation and to hold the stem during tightening or adjustment of packing nut 48.

Although forming no particular part of the invention, a spring 56 may be positioned between the under surface of handle 50 and the upper surface of the body section 12. Spring 56 grounds the handle to the body to prevent static electrical discharges which could be dangerous in certain process uses of the valve.

Figure 2:
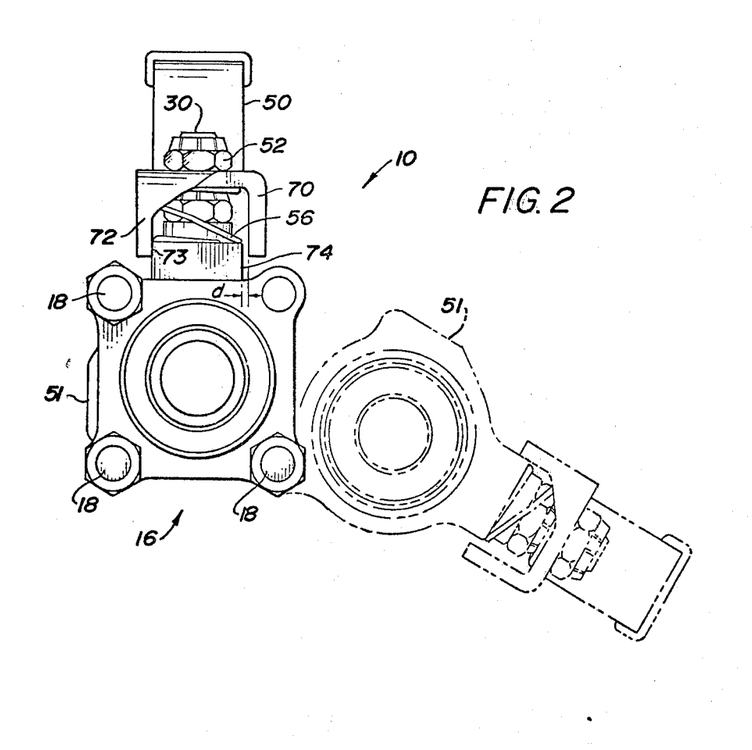
FIG. 2 is an end view of the valve of FIG. 1 including a showing of the central body section in the swing-out position in phantom.

Referring again to FIG. 4, it will be seen that the body section 12 has a radially outward extending portion 47 through which the lower right-hand tie bolt 18 passes as viewed therein. The remaining tie bolts 18 are located radially outwardly of the central body section 12. It should be noted, however, as shown in both FIGS. 2 and 4, that the end members 14 and 16 are each provided with openings through which all of the tie bolts pass. The configuration of the body is such that by merely loosening the tie bolts, and removing the upper right-hand tie bolt 18, the body section 12 can be pivoted outwardly in a clockwise direction as shown in FIG. 2. Preferably, the upper right-hand tie bolt 18 is marked with some indicia to clearly distinguish it from the remaining three bolts. For example, it can be color-coded or have a head or nut configuration different from that of the remaining bolts.

The central body section 12 has, as previously mentioned, smooth, generally parallel, end faces so that the tilt-out movement can take place without axial movement of the associated piping. Additionally, when the body is pivoted outwardly, the seal assemblies 26 can be removed axially from the ends of the body section 12. Similarly, while in the tilt-out position, rotation of the operating handle 50 to the valve closed position allows the ball to be slid longitudinally out of the body section. The stem can then be changed by releasing the nuts 52 and 48. Also, the stem, which can be withdrawn from inside the body, releases the thrust member 40 and packing 42 so that they can be changed as necessary.

Although each of the end members 14 and 16 are preferably identical, they could have varying configurations and different types of pipe connection means. In FIG. 3 of the subject embodiment, the pipe connection means are shown as standard pipe threads 62 and 64, respectively.

To facilitate holding of the body section during installation or removal of the associated piping, means are provided to allow the body to be gripped without relying on the tie bolts. As best seen in FIG. 4, the body includes a portion 49 extending outwardly beyond the left side tie bolts 18 to establish a wrench flat 51. A conventional wrench can thus be used to grip the body between flat 51 and portion 47 as shown in phantom in FIG. 4.

Figure 1:
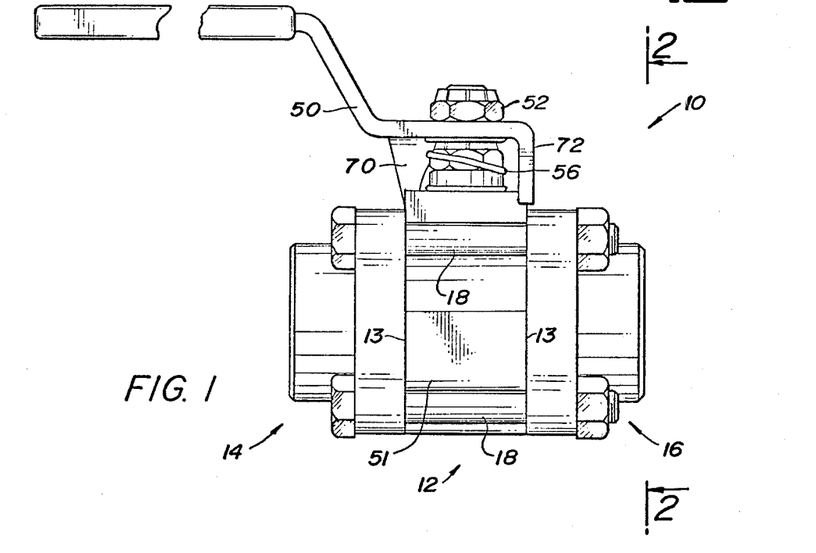
FIG. 1 is a side elevation of a ball valve incorporating the invention.
Figures 5, 6, 6A:
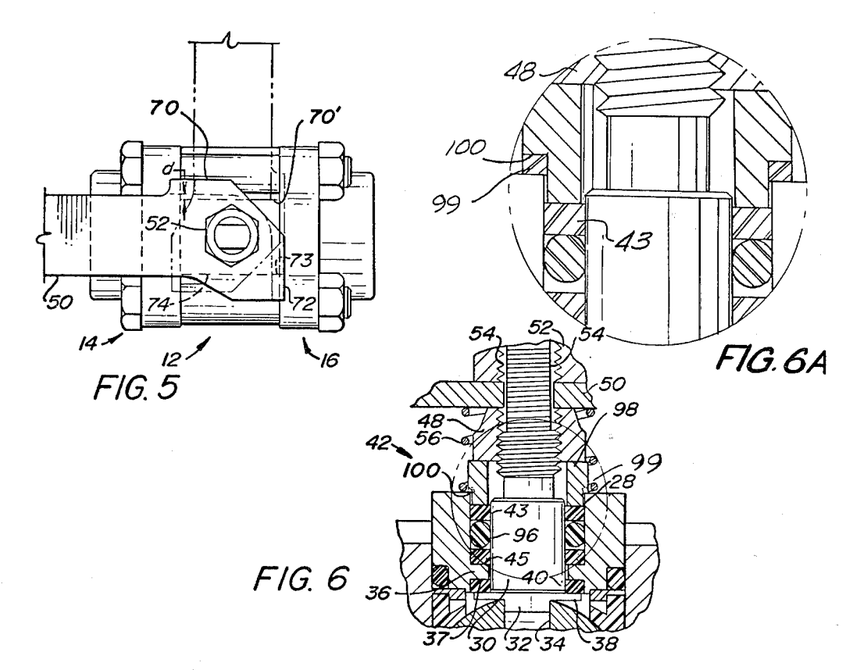
FIG. 5 is a view taken on line 5—5 of FIG. 1.
FIG. 6 is an enlarged cross-sectional view of a modified form of stem packing arrangement for the valve of FIG. 3.
FIG. 6A is an enlarged view of the circled section of FIG. 6.

Referring now to the operating handle 50, it should again be noted that it is contemplated that the handle be formed from a simple metal stamping. The outer end of the handle is preferably covered with a resilient material to provide a suitable grip. It will be appreciated that the handle can be color-coded for process identification, safety, or the like. The handle is further provided with a pair of downwardly extending stops 70 and 72 arranged to define the full open and full closed positions of the valve. The stops are located to engage the lateral sides of the upwardly extending central rib 74 which extends throughout the length of the body section. The configuration of the stops is best shown in FIGS. 1, 2 and 5. It should be noted that the stop member 70 extends downwardly from the side of the handle 50 and the stop 72 is bent downwardly from the end of the handle. In the full open position, the inner surface 73 of stop 72 engages the right-hand end of rib 74 as viewed in FIG. 1. The configuration of the stop is such that the forces acting thereagainst when it is moved to the full open position do not act against the bend of the handle. At this time, the stop member 70 is spaced outwardly a short distance from the inside of the rib as can be seen in FIG. 2. However, when the handle is rotated to the full closed position as shown in phantom in FIG. 5, stop member 70 engages as shown at 70'. That is, it engages the right-hand end of rib 74. Thus, it is also loaded in the most satisfactory direction so that an outward bending force is not applied against the normal bend of the stop. The stop member 72 is, however, at this time spaced outwardly from the rib so that no bending forces are applied to it.

As will be appreciated from the foregoing, the stop positioning and design is such that the stops of the simple bent metal handle are always loaded in their direction of greatest strength and can never be inadvertently bent back into the plane of the handle as would be the case if they engaged at both the open and closed positions of the valve. Because of the stop design, the handle is reversible. That is, it can be positioned to extend in either direction relative to the valve body. Also, because the handle can be simple metal stamping, a wide variety of handle types can be provided. For example, the handle length can be changed without any major change in patterns or the like.

Figure 7:
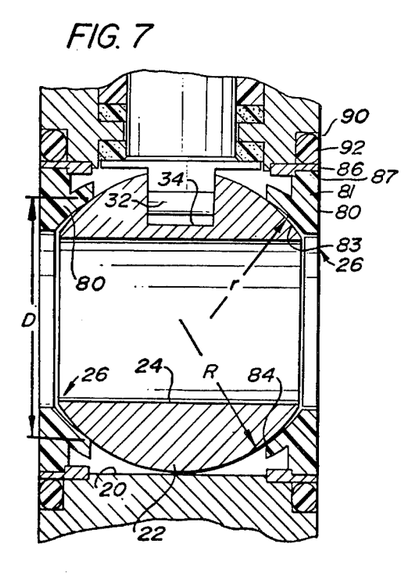
FIG. 7 and 8 are enlarged cross-sectional views through the ball and the seal rings showing the seal rings in the valve open and closed positions, respectively; and, FIG. 9 is an enlarged view of the circled portion of FIG. 7.
Figure 8:
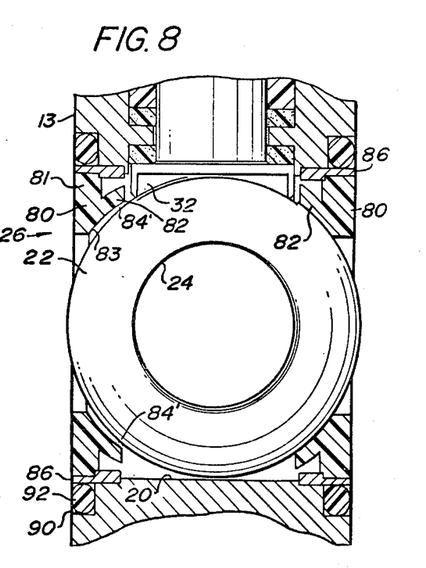
Figure 9:
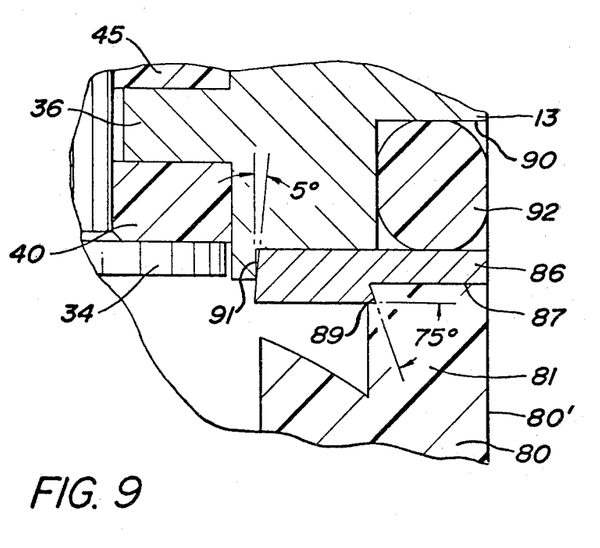

In the embodiment under consideration, and with reference to FIGS. 7–9, each of the assemblies 26 include a first seat ring member 80 which is formed from any suitable material such as TFE, nylon, rubber, synthetic elastomers, asbestos, carbon, graphite, metals, and/or combinations of these materials. The ring member 80 includes a main radially extending body portion 81 and a lip portion 82 which extends axially inwardly toward the valve ball 22. The inner surface 83 of the ring 80 is a spherical section having a radius r slightly smaller than the radius R of the ball. The ring is sized such that when in position in the valve with the ball generally centered, it sealingly engages the ball along a line 84. This relationship is shown in FIG. 7. The opposite side of the body portion 81 is preferably flat and engages the end face of the corresponding end fitting.

As best seen in FIGS. 7 and 9, a cylindrical sleeve 86 circumferentially surrounds the outer peripheral edge of the seat ring 80. Sleeve 86 has a shallow, axially extending recess 87 which has a depth axially less than the thickness of the ring body section 81. Preferably, the sleeve engages the ring 80 rather tightly. Although shown as being formed from metal, it should be appreciated that the ring can be formed from any material having suitable rigidity. Referring more particularly to FIG. 9, it will be seen that the bottom of recess 87 is inclined to provide a sharp edge 89 which, when the seat ring 80 is engaged by the associated end fitting, provides a good seal at this point. The body section 12 in the area surrounding the outer end of the throughflow passage 20 is counterbored to slidably receive the sleeve 86, and the inner end of sleeve 86 is inclined slightly so that somewhat of a line contact is made with the bottom or corner 91 of this recess to similarly provide a seal. As best seen in FIGS. 7 and 8, the outer edge of the ring 80 is clamped between the bottom of the recess 87 and associated face of the end fitting.

Resiliently encircling the sleeve 86 is an O-ring member 92. A corresponding recess 90 is formed in the body section 12 to receive O-ring 92. As can be appreciated, the entire assembly 26 can be inserted and removed as a unit. The sleeve 86 serves to locate and hold the seat ring while, additionally, completing the groove for the O-ring 92.

The presence of the sleeve 86 prevents the ring 80 from cold flowing between the body and the end fittings. Additionally, as noted earlier, the face 80' of the ring 80 seals against the end fitting to provide additional sealing between the body and the end fittings. It should be noted, however, that the primary seal between the center body section 12 and both end members 14 and 16 are provided by the O-rings 92. The sealing between the ball and the end members is assured by the ring 80.

FIG. 7 shows the general position of the elements when the ball is in the full open position. When the ball is moved to a closed position, FIG. 8, under little or no fluid pressure, the position of the ball and the lips of the seat rings 80 will be substantially the same as illustrated in FIG. 7. The upstream seat ring 80 contacts the ball about diameter D with substantially line contact. This provides a low-pressure seal. However, a wedge opening is left between the inner periphery of the seat ring and the ball for fluid pressure to act on the area of the ball within diameter D. As fluid line pressure increases, the ball will move in a downstream direction away from the upstream seat, and the seal between the upstream seat and the ball breaks as the 84' in FIG. 8. As the ball moves downstream, the downstream seal flexes increasing the area of contact (the seal area) between the ball and the seat. The design of the lip portion 82 is such that it can flex somewhat like a cantilevered beam. Increasing contact area between the seat ring and the ball with increasing pressure serves to provide adequate support for the ball.

FIG. 6 shows a modified form of stem packing for the unit. This packing is basically the same as that discussed hereinabove with reference to the FIG. 1 embodiment. The difference, however, is that the intermediate ring 44 is replaced by an O-ring 96. The space between the upper and lower containment rings 43 and 45 in which the O-ring 96 is retained is controlled by the design of the packing gland 98. As shown, gland 98 has an outwardly extending shoulder 100 which engages the top of the valve body section 12 to prevent it from being improperly tightened to compress the O-ring and destroy the effectiveness of the seal. As shown in FIG. 6A, the gland rides on a thrust ring 99 so that it may turn freely.

The three-piece body and end fitting assembly hereinabove disclosed could be formed by many different manufacturing methods. For example, bar stock is available in many standard configurations and could be used for forming the three main components. Also, forgings or castings could be used. These particular methods are not, however, particularly desirable. First, the use of standard bar stock provides only a limited number of starting shapes which would require considerable machining and substantial loss in material. Forgings or castings likewise have distinct disadvantages. For example, with either a forging or a casting, draft angles must be provided and tolerances of ±1/32 inch are about the best obtainable. Also, flashing is generally present, and it is very difficult to provide parallel surfaces. Because of the tolerance problems and the lack of parallelism, machining difficulties are encountered since there are no surfaces which can readily be used for locating. Also, forging or cast components often have lower hardness and tensile strength than desirable.

According to the present invention, extruded bar stock having the cross-sectional configuration shown in FIG. 4 is preferably used for forming the central body section. Likewise, extruded bar stock is preferred for the end fittings. The advantages over the previously discussed methods are the following:

1. Close tolerances (±0.02 inch if hot extruded, or ±0.005 inch if cold drawn).
2. Better and more uniform strength.
3. Substantial material savings.
4. Substantial savings in machining time and setup because of the close tolerances.

To form the central body section from an extrusion of the general type mentioned, it is only necessary to take the extruded bar and saw it to the required length. Thereafter, the opposed end faces can be ground or machined to the required final thickness and surface finish. When the opposed end faces have been finished, the centerbore can be made. The centerbore can then be used for chucking the body section internally while the counterbore operation is carried out. Similarly, the centerbore can be used for exact location of the bolt hole for the swing-out arrangement.

By the use of an extrusion, tolerances are close enough to allow the external surfaces to be used for most locating. Additionally, the extrusion eliminates milling operations which would normally be required for providing handle stops of the type described or for providing the above-described wrench surfaces.

The end fittings, when made from an extrusion, can be quickly machined on a conventional multiple spindle machine. Additionally, the described advantages are even more important when it is noted that the same basic body and end fitting structure can be used in a wide variety of flow system devices. This produces additional savings because of volume and reduction of inventory requirements for a complete line of fluid flow devices.

The invention has been described in great detail sufficient to enable one of ordinary skill in the art to make and use the same. Obviously, modifications and alterations of the preferred embodiment will occur to others upon reading and understanding of the specification and it is our intention to include all such modifications and alterations as part of our invention insofar as they come within the scope of the appended claims.

What is claimed is:

1. A flow system device comprising:
   a body section having a longitudinal through-flow passage which extends between a pair of generally parallel end faces, said body section having seal ring assemblies positioned about each end of said through-flow passage and which seal ring assemblies are axially removable from said body section, said body section further having a protrusion extending outwardly thereof substantially longitudinally therealong;
   a pair of end fitting members each having a through opening, said end members being positioned on opposed ends of said body section in engagement with the end faces thereof with said through openings aligned with said through-flow passage;
   four tie bolts extending between said end fittings for interconnecting said body section and end fittings, said tie bolts being positioned generally equidistantly apart from each other around said end fittings to form a generally rectangular pattern radially disposed from said through-flow passage and extending generally parallel thereto, said tie bolts being comprised of a pair of upper and a pair of lower tie bolts, one of said lower tie bolts extending through said body section with the remaining tie bolts located radially outward of the body and said protrusion engaging the other of said lower tie bolts, said tie bolts being spaced in said end fittings such that removal of the upper tie bolt disposed diagonally opposite said other lower tie bolt and loosening of the remainder of the tie bolts permits arcuate movement of said body section about said one lower tie bolt for gaining access to the through-flow passage of said body section.

2. The flow system device as defined in claim 1 wherein said protrusion defines a wrench flat and facilitates gripping of said body section on opposite sides thereof by a conventional wrench without engaging said tie bolts.

3. The flow system device as defined in claim 1 wherein said body section has a uniform cross-sectional configuration in all planes perpendicular to the axis of said through-flow passage.

4. A valve comprising:
   a body section having a longitudinal through-flow passage which extends between a pair of generally parallel end faces, said body section having a ball member mounted therein and seal assemblies positioned about each end of said through-flow passage, said seal assemblies being axially removable from said body section, said body section further having a protrusion extending outwardly thereof substantially longitudinally therealong;
   a pair of end fitting members each having a through opening, said end members being positioned on opposed ends of said body section in engagement with the end faces thereof with said through openings aligned with said through-flow passage;
   four tie bolts extending between said end fittings for interconnecting said body section and end fittings, said tie bolts being positioned generally equidistantly apart from each other around said end fittings to form a generally rectangular pattern radially disposed from said through-flow passage and extending generally parallel thereto, said tie bolts being comprised of a pair of upper and a pair of lower tie bolts, one of said lower tie bolts extending through said body section with the remaining tie bolts located radially outward of the body and said protrusion engaging the other of said lower tie bolts, said tie bolts being positioned in said end fittings such that removal of the upper tie bolt disposed diagonally opposite said other lower tie bolt and loosening of the remainder of the tie bolts permits arcuate movement of said body section about said one lower tie bolt for gaining access to the through-flow passage of said body section.

5. The ball valve as defined in claim 4 wherein said seal assemblies include a first portion for sealing between said body section and said end member and a second portion for sealing between said body section and said ball member.

6. The ball valve as defined in claim 4 wherein said body section has a uniform cross-sectional configuration in all planes perpendicular to the axis of said through-flow passage.

7. The ball valve as defined in claim 6 including a rib member extending outwardly of said body section generally longitudinally therealong and having opposed side walls; and,
    a ball actuating stem extending through said rib into engagement with said ball.

8. The ball valve as defined in claim 7 including a packing ring carried in said rib and located about said stem and means carried on said stem for compressing said packing.

9. The ball valve as defined in claim 6 including a flange portion extending from said body toward said stem, said stem having an outwardly extending flange located radially inward of said body flange and a bearing member positioned between said flanges.

10. The valve as defined in claim 7 including a handle member connected to the outer end of said stem: and,
    stop members extending from said handle for engagement with said rib at predetermined points of handle rotation.

11. The valve as defined in claim 4 wherein said ball member is engaged by a stem extending radially through said body section, said stem being slidably connected with said ball whereby said ball can be removed axially from said bore.

12. The valve as defined in claim 11 including axially removable seal ring assemblies positioned in each end of said through-flow passage and having seat ring portions engage the outer surface of said ball.

13. The ball valve as defined in claim 4 wherein said protrusion defines a wrench flat and facilitates gripping of said body section on opposite sides thereof by a conventional wrench without engaging said tie bolts.

14. A ball valve comprising:
a body section terminating in end faces and having a longitudinally extending bore connected between said end faces with a ball member positioned in said bore and mounted for rotation therein to control flow of fluid therethrough;
a pair of end fitting members each having a through opening, said end members being positioned on opposed ends of said body section in engagement with said end faces with the through openings aligned with said bore, said through openings having a smaller diameter than said bore and defining inwardly facing annular shoulders at the interconnection between said end fitting members and said main body section; and,
seal assemblies positioned in opposite ends of said bore adjacent said inwardly extending shoulders, each of said seal assemblies comprised of (1) an annular seat ring formed from a resilient material and having a main body portion including an outwardly facing surface in engagement with one of said inwardly extending shoulders and an outer peripheral surface, said seat ring further including a distinct free standing resilient lip portion extending inwardly toward said ball in a radially outward direction for engagement therewith, (2) a metal sleeve member closely encircling said outer peripheral surface of said seat ring and slidably received in an annular recess formed about the end of said bore and having an inner end wall with the innermost end of said sleeve engaging said recess inner end wall, and (3) a resilient seal ring member encircling said sleeve member.

15. The valve as described in claim 14 wherein said metal sleeve member includes an axially extending recess in the inner peripheral wall thereof which receives the outer peripheral surface of said seat ring.

16. The valve as described in claim 14 wherein said resilient seal ring is received in a groove defined by said sleeve member and a counterbored area in said body section end face communicating with said body section bore.

17. The valve as defined in claim 16 wherein the cross-sectional diameter of said seal ring is slightly greater than the correspondinng depth of said groove.

18. A valve comprising:
a body section having a longitudinal through-flow passage which extends between a pair of generally parallel end faces, said body section having a ball member mounted therein and seal assemblies positioned about each end of said through-flow passage, said seal assemblies being axially removable from said body section, said body section further having a protrusion extending outwardly thereof substantially longitudinally therealong;
a pair of end fitting members each having a through opening, said end members being positioned on opposed ends of said body section in engagement with the end faces thereof with said through openings aligned with said through-flow passage;
at least three tie bolts extending between said end fittings for interconnecting said body section and end fittings with said tie bolts being spaced apart from each other around said end fittings, one of said tie bolts extending through said body section with the remaining tie bolts located radially outward of the body and said protusion engaging another of said tie bolts, said at least three tie bolts being spaced apart in said end fittings such that removal of a single tie bolt other than said one and said another tie bolts and loosening of the remainder of said at least three tie bolts permits arcuate movement of said body section about said one tie bolt for gaining access to the through-flow passage of said body section.

19. A flow system device comprising:
a body section having a longitudinal through-flow passage which extends between a pair of generally parallel end faces, said body section having seal ring assemblies positioned about each end of said through-flow passage and which seal ring assemblies are axially removable from said body section, said body section further having a protrusion extending outwardly thereof substantially longitudinally therealong;
a pair of end fitting members each having a through opening, said end members being positioned on opposed ends of said body section in engagement with the end faces thereof with said through openings aligned with said through-flow passage;
at least three tie bolts extending between said end fittings for interconnecting said body section and end fittings with said tie bolts being spaced apart from each other around said end fittings, one of said tie bolts extending through said body section with the remaining tie bolts located radially outward of the body and said protrusion engaging another of said tie bolts, said at least three tie bolts being spaced apart in said end fittings such that removal of a single tie bolt other than said one and said another tie bolts and loosening of the remainder of said at least three tie bolts permits arcuate movement of said body section about said one tie bolt for gaining access to the through-flow passage of said body section.

\* \* \* \* \*